United States Patent

Hajjar

[11] Patent Number: 6,062,530
[45] Date of Patent: May 16, 2000

[54] LIFT VALVE WITH PRESSURE BALANCED PILOT OPERATED VALVE MEMBER

[75] Inventor: Elias Hajjar, New South Wales, Australia

[73] Assignee: E.S.H. Consulting Engineers Pty Limited, Bankstown, Australia

[21] Appl. No.: 08/952,029

[22] PCT Filed: May 3, 1996

[86] PCT No.: PCT/AU96/00263

§ 371 Date: Jan. 21, 1998

§ 102(e) Date: Jan. 21, 1998

[87] PCT Pub. No.: WO96/35067

PCT Pub. Date: Nov. 7, 1996

[30] Foreign Application Priority Data

May 5, 1995 [AU] Australia ................................ PN6412

[51] Int. Cl.[7] .......................... F16K 31/383; F16K 31/34
[52] U.S. Cl. ......................... 251/37; 251/28; 251/30.01; 137/244
[58] Field of Search .................... 251/25, 28, 29, 251/30.01, 30.02, 30.03, 33, 37, 38, 39; 137/244

[56] References Cited

U.S. PATENT DOCUMENTS

| | | | |
|---|---|---|---|
| 2,712,325 | 7/1955 | Andrus | 137/244 X |
| 4,785,842 | 11/1988 | Johnson, Jr. | 251/65 X |
| 5,042,775 | 8/1991 | Williamson et al. | 31/128 |

FOREIGN PATENT DOCUMENTS

| | | | |
|---|---|---|---|
| 24554/92 | 9/1991 | Australia | 31/39 |
| 49074/93 | 5/1994 | Australia | 31/34 |
| 55204/94 | 9/1994 | Australia | 31/34 |
| 0 259 512 | 12/1986 | European Pat. Off. | 17/32 |
| 1 059 364 | 11/1959 | Germany . | |
| 1112625 | 5/1965 | United Kingdom . | |
| 2 256 257 | 12/1992 | United Kingdom | 31/8 |
| WO6/11350 | 10/1995 | WIPO | 31/8 |

*Primary Examiner*—Kevin Lee
*Attorney, Agent, or Firm*—Akin, Gump, Strauss, Hauer & Feld, L.L.P.

[57] ABSTRACT

A valve device comprising a first fluid port, a second fluid port, a valve seat and a valve member having a control chamber is formed at least in part by the valve member. A first passageway communicates between the control chamber and a first port and a second passageway communicates between the control chamber and a second port. A control valve is associated with at least one of the passageways to permit fluid flow therethrough and to urge the valve member into one of a seated or lifted position. A spring-biased restrictor is disposed within at least one of the fluid passageways to clean and prevent clogging of the fluid passageway.

18 Claims, 6 Drawing Sheets

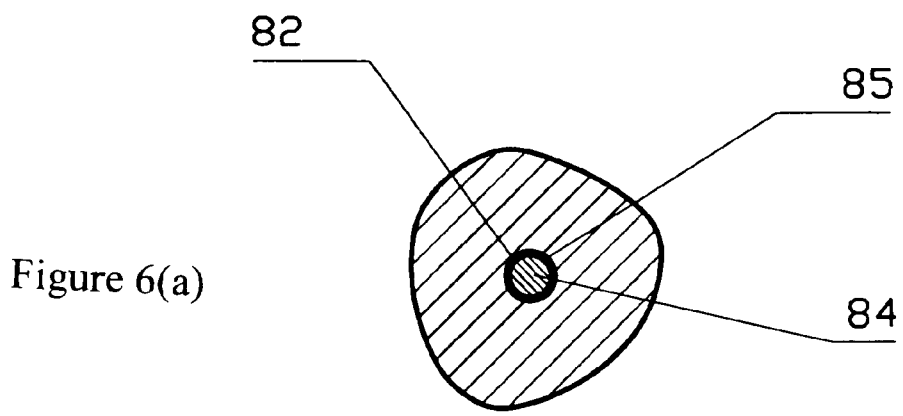
Figure 6(a)
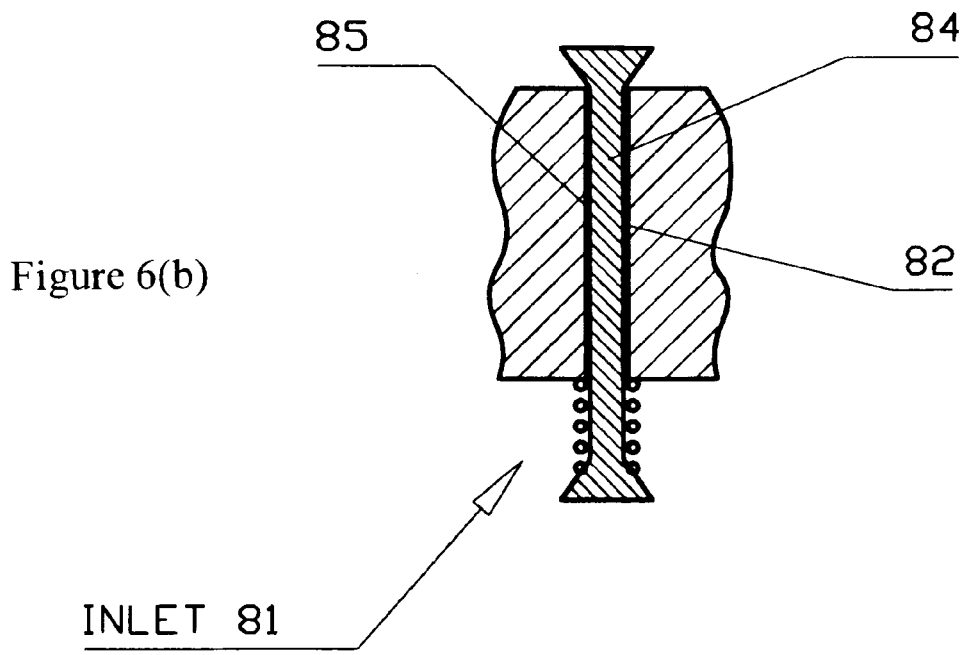
Figure 6(b)
FIG 6

LIFT VALVE WITH PRESSURE BALANCED PILOT OPERATED VALVE MEMBER

BACKGROUND OF THE INVENTION

This invention relates to valves for controlling fluid flows. In particular, this invention relates to a technique which makes it extremely feasible to achieve minute, yet highly consistent fluid flow rates. Making use of this technique will open the way to making fluid valves having low manufacturing and maintenance costs, improved operating characteristics and very weak forces to operate. That is, the solution to the persistent problems other valve manufacturers are trying to ameliorate, is only one part of what this technique offers.

DESCRIPTION OF THE PRIOR ART

Conventional valves have a valve seat and a movable valve member which bears against the valve seat to control the fluid flow. An actuator acts directly on the valve member to cause movement of the valve member. In large valves the forces required to move the valve member may be large, making manual actuation difficult or impossible, in which case a mechanical actuator is required. The present invention aims to at least ameliorate some of the above disadvantages.

Basically at least part of the valve member is exposed to a pressure in a chamber. By altering the pressure in the chamber the direction of the net force applied to the valve member may be changed.

In particular this specification details improved valve structure to those described in the Applicant's earlier Australian Patent Application No. 24554/92.

Conventional pilot operated valves are primarily designed to replace direct acting valves in situations where it is not possible to provide strong forces nor consume high power for controlling said direct acting valves. However, said conventional pilot operated valves have disadvantages and limitations which valve manufacturers are constantly searching for feasible ways to ameliorate.

It appears that these limitations will persist unless the elevated flow rates through the by pass circuit of these pilot operated valves are significantly lowered. These flow rates, however, could not be lowered below a relatively high limit without facing serious flow consistency problems, thereby making it impossible to improve the situation.

SUMMARY OF THE INVENTION

The invention seeks to enable fluid passageways capable of providing minute, yet highly consistent flow rates, and also capable of filtering the fluid, that passes through them, from particles which may block downstream passageways. Said fluid passageways have the properties of firstly, ultra high fluid flow resistance, secondly, self-cleaning, and, thirdly, filtering capabilities (strainer).

The ultra-high flow resistance is achieved by being able to simultaneously reduce the cross-section of the passageway and increase the surface area of its internal walls independently from the flow-path length of said passageway. That is, the cross-section of said passageway will effectively have an elongated shape or a series of elongated shapes.

The self-cleaning is achieved by allowing or by forcing the walls forming the passageway to make the necessary relative movements to each other and by the high speed at which the fluid flows through the passageway. Solid particles and slime may be shaken loose and forced out of said passageway by said wall movements and fluid flow. This process diminishes the effect of slime and solid particles on the flow resistance of said passageway.

The filtering is achieved due to solid particles having effective diameters larger than the width of the cross-section of the said passageway will obviously not enter said passageway, they will rather be allowed to precipitate and/or get washed away from the inlet of said passageway.

In one broad form the invention provides a valve device comprising:

a first fluid port;

a second fluid port;

a valve seat defining an aperture through which fluid may flow from said first port to said second port;

a valve member, moveable relative to said valve seat between a seated position and a lifted position;

a control chamber formed at least in part by said valve member;

a first passageway communicating between said control chamber and said first port;

a second passageway communicating between said control chamber and said second port;

a control valve associated with at least one of said passageways to permit fluid flow therethrough, and to thereby urge said valve member into either said seated or lifted position; and, a flow control element provided within at least one of said passageways to restrict the flow of fluid through said passageways, and, to prevent the ingress of particles which might otherwise clog said passageways and/or flow paths downstream thereof, said flow control element comprising:

a substantially longitudinal element having cross-sectional area smaller than the cross-sectional area of said passageway;

retaining means to retain said element within said passageway whilst permitting movement; and, biasing means, such as a spring, which permits said element to automatically move within said passageway whenever said valve is activated and/or under the influence of fluid movement in said device;

such that, as said element moves, said passageway is cleaned and/or cleared of particulate matter such as dirt and/or other deposits.

Preferably, said retaining means comprises enlarged ends on the ends of the flow control element.

In a preferred form, said flow control element increases response time (reduces water hammer) and/or permits reduction of the required forces to activate the valve.

Preferably, said valve device is a float or flood valve, whereby said control valve comprises a longitudinal actuating member extending through said second passageway, a first end of said actuating member having a sealing means adapted to selectively prevent the passage of fluid through said second passageway, and a second end of said actuating member adapted to be moved, to consequently seal or unseal said sealing means.

Also preferably, said second end of said actuating member is adapted to pivot said actuating member in an axially transverse direction, relative to said sealing means to pivot and thereby selectively permit and prevent the passage of said fluid through said passageway.

Preferably, said second end of said actuating member is adapted to move said actuating member in the axial direction, relative to said sealing means and thereby selectively prevent and permit the passage of said fluid through said passageway.

Preferably, said actuating member is integrally formed with said flow control element.

Preferably, said second end of said actuating member is provided with a heavy or light weight load thereon adapted to respond to the level of fluid surrounding said second end of said actuating member.

In a further broad form, the present invention provides a valve device comprising:

an actuating member adapted to directly or indirectly control the flow of fluid, moveable between first and second positions, said actuating member being formed of ferromagnetic or magnetic material;

a control means, comprised of magnetic or ferromagnetic material to cooperated with and control the movement of said actuating member when brought into proximity therewith.

Preferably, said actuating member is provided within a housing, an upper portion of said housing being additionally provided with a control means storage position to store said control means whilst not is use.

In a further broad form, the present invention provides a flow control element adapted to be provided within a substantially longitudinal fluid passageway of a valve device, said flow control element comprising:

a substantially longitudinal element having a cross-sectional area smaller than the cross-sectional area of said passageway;

retaining means to retain said element within said passageway whilst permitting automatic movement of said element relative to said passageway; and, a biasing means, such as a spring, which permits said element to alter its position within said passageway;

such that, said flow control element enables a consistent low flow-rate of fluid through said passageway whilst said automatic movement of said element relative to said passageway cleans and/or clears said passageway from particulate matter such as dirt and/or deposit whilst preventing the ingress of particles which might otherwise clog said passageway and/or flow paths downstream thereof.

Preferably, said retaining means comprises enlarged ends.

DESCRIPTION OF THE DRAWINGS

The invention shall now be described with reference to the non-limiting embodiment and the drawings in which:

FIG. 6 shows yet another aspect of the invention, incorporating a flow control, resistor/cleaner element; and, FIG. 7 shows a schematic cross-sectional view of a preferred embodiment of the invention, incorporating various features of the invention.

DETAILED DESCRIPTION OF PREFERRED EMBODIMENT

Throughout the drawings, like numerals will be utilised to identify similar features, except where expressly otherwise indicated.

Figure 1:
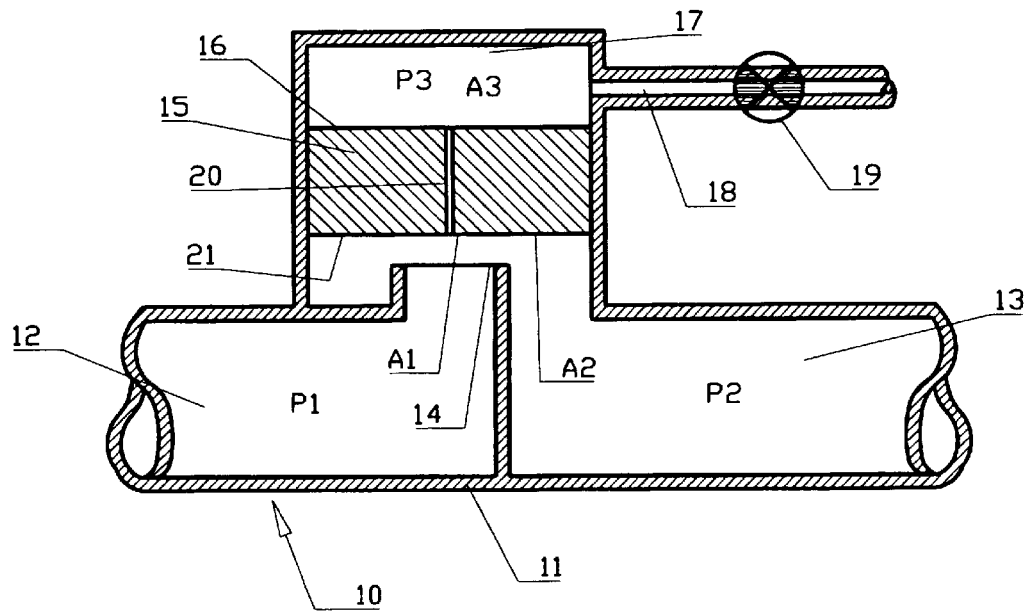
FIG. 1 is a schematic cross-section of a known valve device.

The main principles of this invention is illustrated by FIG. 1, wherein the Applicant's earlier valve device is shown. The valve device shown in FIG. 1 is described in the Applicant's earlier Patent Application No. 24554/92, the disclosures of which should be considered to be incorporated herein by the reference thereto.

An important feature to note is that the cross sectional area (A) of piston 15 is greater than that of the seat valve.

FIG. 1 shows that when the small valve is closed the pressure in chamber 17 will reach the supply pressure, hence, because the downward force ($F=AP\mu$) on the piston is greater than the upward force ($f=aP\mu$), the piston will be pushed against the valve seat 14 causing the valve to close.

Now, because the pressure in chamber 17 can be varied by opening and closing the small valve 19 the main flow rate through the device will accordingly vary with it.

Further details will become apparent from the following detailed description.

The valve 10 has a housing 11 defining a fluid inlet 12, a fluid outlet 13 and a valve seat 14. A valve member 15 is slideably mounted in the housing 11 to be movable generally perpendicular to the valve seat 14. The valve member 15 cooperates with the valve seat 14 to control fluid flow between the fluid inlet 12 and fluid outlet 13.

The housing 11 and upper surface 16 of the valve member 15 together define a chamber 17. A first passageway 18 communicates the chamber 17 with the fluid outlet 13. Communication between the chamber 17 and the fluid outlet 13 is controlled by a control valve 19. A second passageway 20 passes through the valve member 15 to communicate the fluid inlet 12 with the chamber 17. When the control valve 19 is open a flow occurs from the inlet 12 through the chamber 17 to the outlet 13. The chamber pressure $P_3$ will lie intermediate the inlet pressure $P_1$ and outlet pressure $P_2$. Assuming this second passageway 20 provides much a greater restriction to fluid flow than does the first passageway 18, when the control valve 19 is open the pressure $P_3$ in the chamber 17 will be substantially equal to the pressure $P_2$ in the fluid outlet 13. However when the control valve 19 is closed the pressure $P_3$ is equal to the pressure $P_1$ in the fluid inlet 12.

Resolving in the direction of movement of the valve member 15, the upper surface 16 of the valve member has an area $A_3$ exposed to chamber pressure $P_3$ while its lower surface 21 has a first area $A_1$ exposed to the fluid inlet pressure $P_1$ and a second area $A_2$ exposed to the fluid outlet pressure $P_2$.

The net force R applied to the valve member is:

$$R=P_1A_1+P_2A_2-P_3A_3$$

where $$A_1+A_2=A_3$$

When the control valve 19 is closed $$P_3=P_1$$

and thus $$R=P_1A_1+P_2A_2-P_1A_3$$

$$R = P_1[A_1 - A_1 - A_2] + P_2 A_2$$

$$R = A_2[P_2 - P_1]$$

However $P_1 > P_2$ and therefore R is negative and the valve member is urged downwards against the valve seat. It will be noted that even when the valve is partially open the pressure applied to area $A_1$ will be greater than that applied to area $A_2$. Accordingly closing of control valve 19 will result in the valve member 15 sealing against the valve seat 14.

When the control valve is open $$P_3 = P_2$$

and thus $$R = P_1 A_1 + P_2 A_2 - P_2 A_3$$
$$= P_1 A_1 + P_2 A_2 - P_2 A_1 - P_2 A_2$$
$$R = A_1[P_1 - P_2]$$

but $P_1 > P_2$ and therefore R is positive and the valve member is urged upwards away from the valve seat.

It will be appreciated that this is an idealised description and in reality the pressure $P_3$ in the chamber will lie between the fluid inlet pressure $P_1$ and the fluid outlet pressure $P_2$.

It will also be appreciated that even when the valve is partially open the pressure $P_1$ applied to area $A_1$ still always be greater than pressure $P_2$ applied to area $A_2$, so long as a flow occurs. Thus basically the same equations apply and changing the control valve 19 from open to closed or vice versa will result in a corresponding movement of the valve member 15.

Should the fluid outlet 13 be blocked no flow occurs and in whatever configuration $$P_1 = P_2 = P_3$$

and no net force is applied to the valve member 15. A spring may be provided to move the valve member to an open or closed position, depending on preferences.

It will be appreciated that the control valve 19 may be located in the second passageway 20. In this configuration when the control valve 19 is closed the chamber pressure $P_3$ is equal to the fluid outlet pressure $P_2$ and the valve member 15 will rise to open the valve 10. Conversely when the control valve 19 is open the pressure $P_3$ in the chamber 17 will rise, preferably near to $P_1$, and the valve 10 will close.

Figure 2:
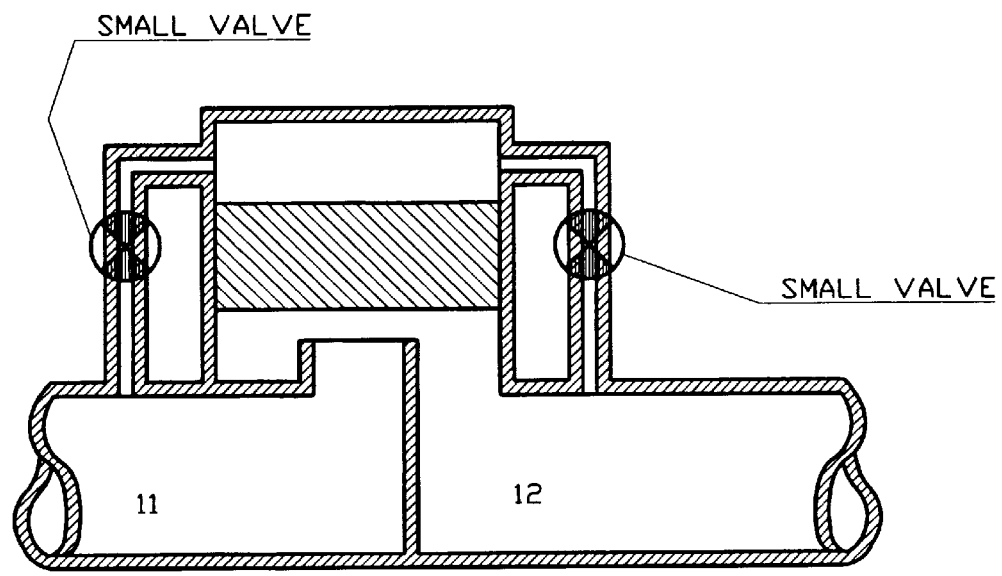
FIG. 2 is a schematic cross-section of another known valve device.

FIG. 2 shows a variation to the valve device of FIG. 1. In FIG. 2, the passageway is provided in an alternative position, rather than through the piston 15, achieving, the same function. It is not important which one of the ports 11 or 12 is of higher pressure, because by appropriate adjustment of one of the small valves the main flow rate through the device can then be controlled by the other.

Figure 3:
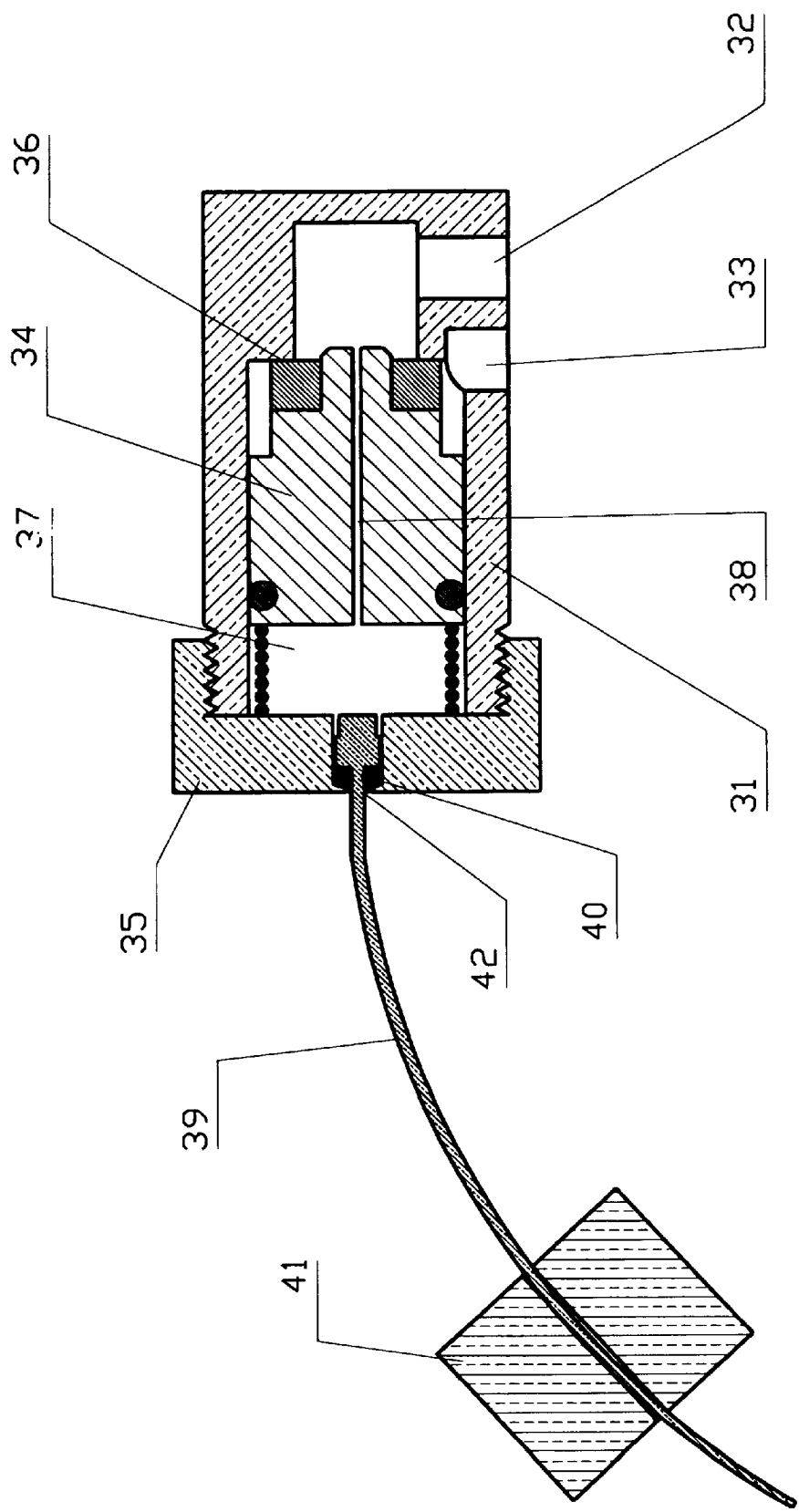
FIG. 3 shows a partial cross-section of a first embodiment of an horizontal float or flood valve device according to the invention.

FIG. 3 illustrates a cross-sectional view of an actual device in which the principles described hereinbefore is applied, and which is modified to be used with a float or flood valve, in this case, a horizontal float or flood valve.

The valve comprises a body 31 having inlet 32, outlet 33 and an opening which, together with piston 34 and cap 35, form the valve seat 36 and chamber 37. Inlet 32 communicates with chamber 37 by opening 38. Arm 39 and O-ring 40 together with weight 41 form the small flow control valve 42. Valve 42 may be opened my moving 39 out of it's stable position. Using weight 41 is one way of causing this movement. FIG. 3 shows that without the effect of weight 41 on arm 39, valve 42 will remain closed, hence the pressure in chamber 37 will be as high as that of inlet 32, causing piston 34 to move against the valve seat 36 and shutting the main flow down. By opening valve 42 to the extent that the pressure in chamber 37 is low enough to allow piston 34 to move away from the valve seat 36 and allow the fluid to flow from inlet 32 to outlet 33.

Figure 4:
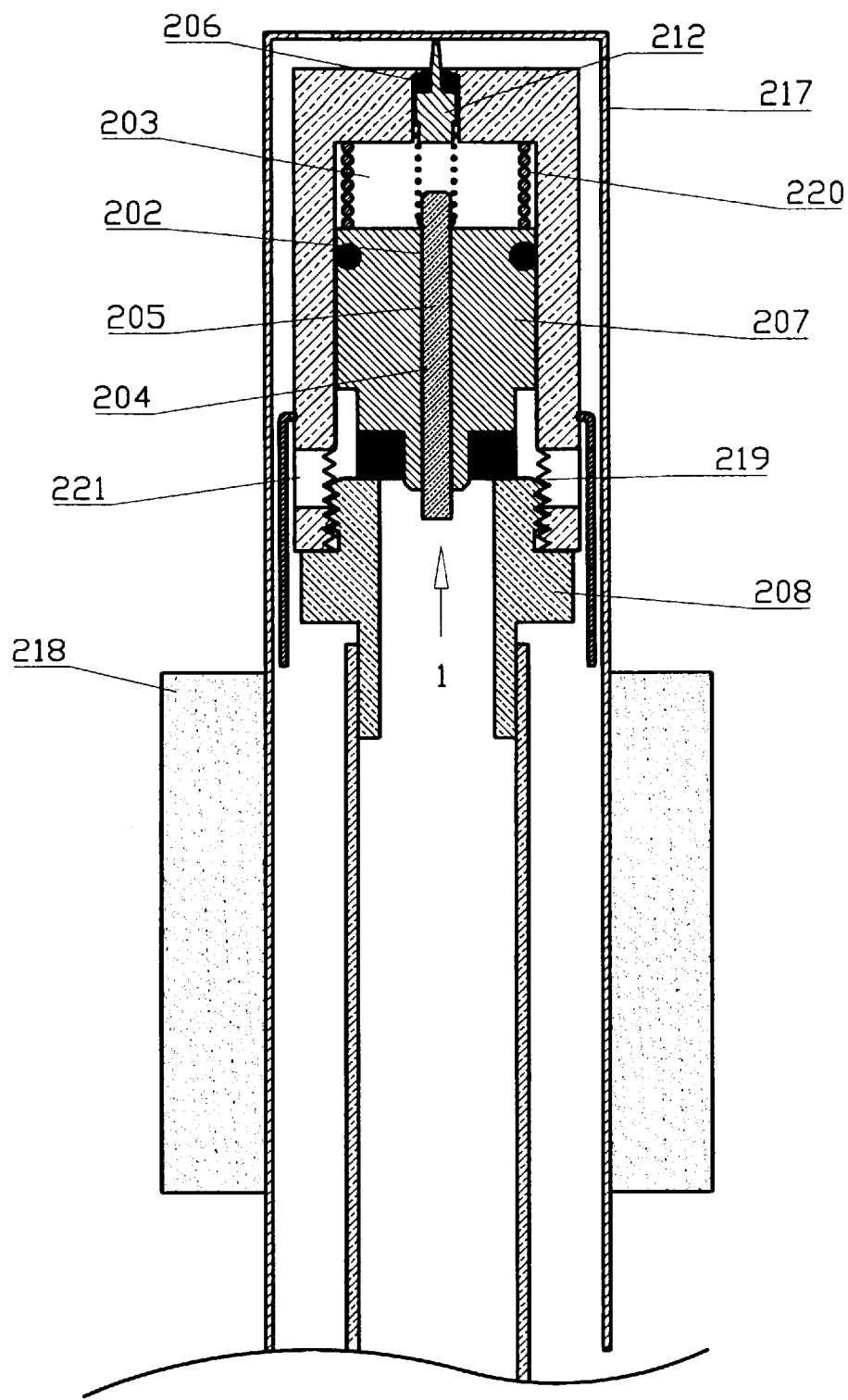
FIG. 4 shows a partial cross-section of a second embodiment of a vertical float or flood valve device according to the invention.

In FIG. 4 is shown an alternative arrangement of a flood or float valve in accordance with the invention, this time being embodied as a vertical valve. In this case, a float 217 is provided about the valve 207. Operation of the actuating member 212 is achieved by contact of the inner surface of the float 217. FIG. 4 also illustrates the provision of a longitudinal flow control element 204 in accordance with another aspect of the invention, which will be more fully described hereinafter with reference to FIG. 6. In operation, as the float 217 rises, the actuating member 212 also rises (either by being attached to the float, or by suitable biasing means) such that a seal 206 about the actuating member 212 moves, allowing the flow of fluid through the passageway, consequently operating the valve. This type of configuration enables the device to also act as a silencer.

Figure 7:
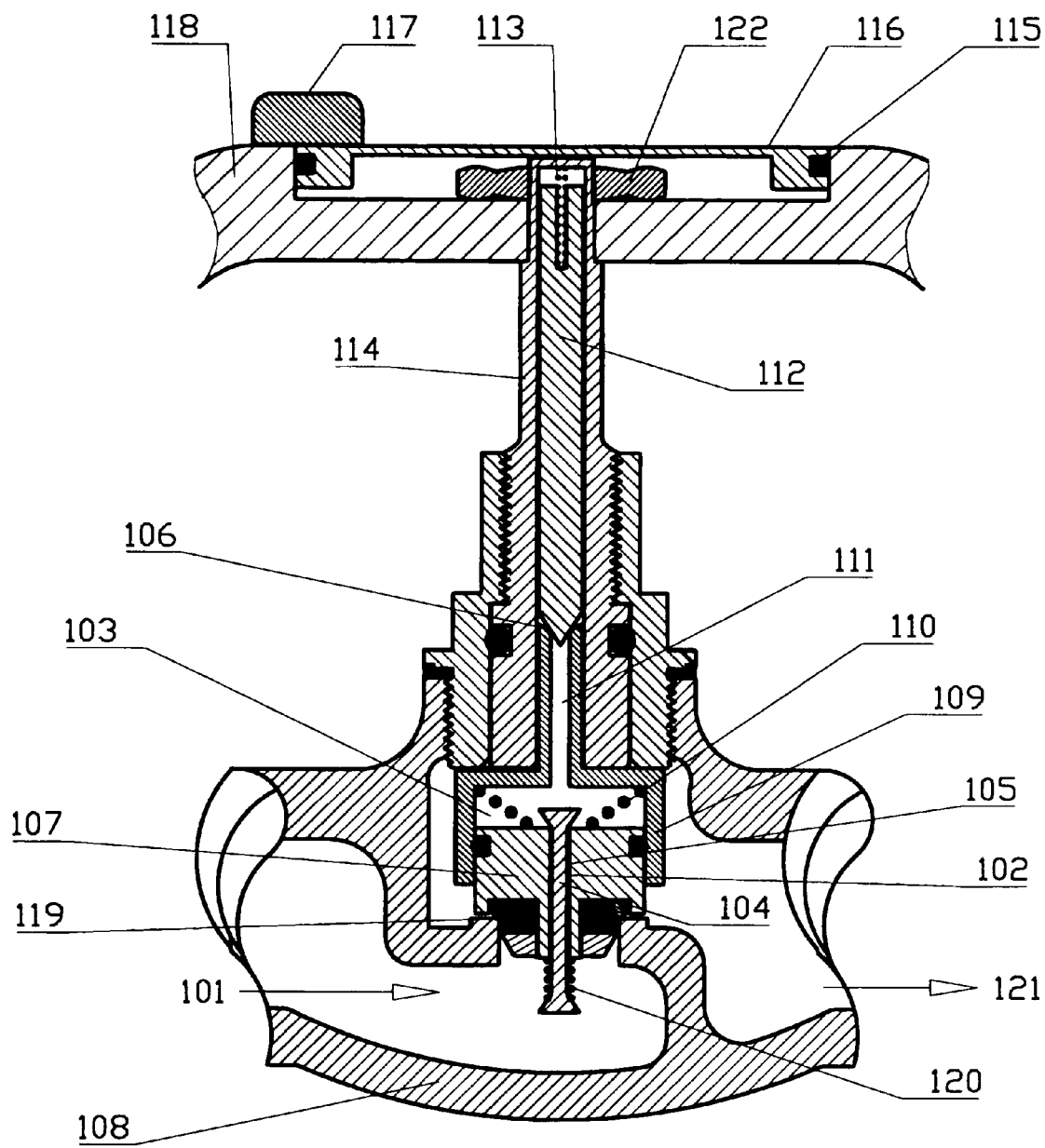

The form of the invention illustrated by FIG. 4 is used as a float control valve, which operates the same way as that of FIG. 7, which will be described hereinafter except for the opening and closing of the relief valve, where the magnetic activation used in FIG. 7 is replaced by member 217. Because the valve is mounted vertically inside a tank the weight of member 217 pushed member 212 down to open relief valve 206.

Member 218 (which is considerably lighter than water) can be positioned anywhere along the height of member 217. When the fluid level in the tank rises high enough to upwardly push member 218 along with member 217 away from member 212, the relief valve then reverts to its closed position causing the valve to close.

Figure 5:
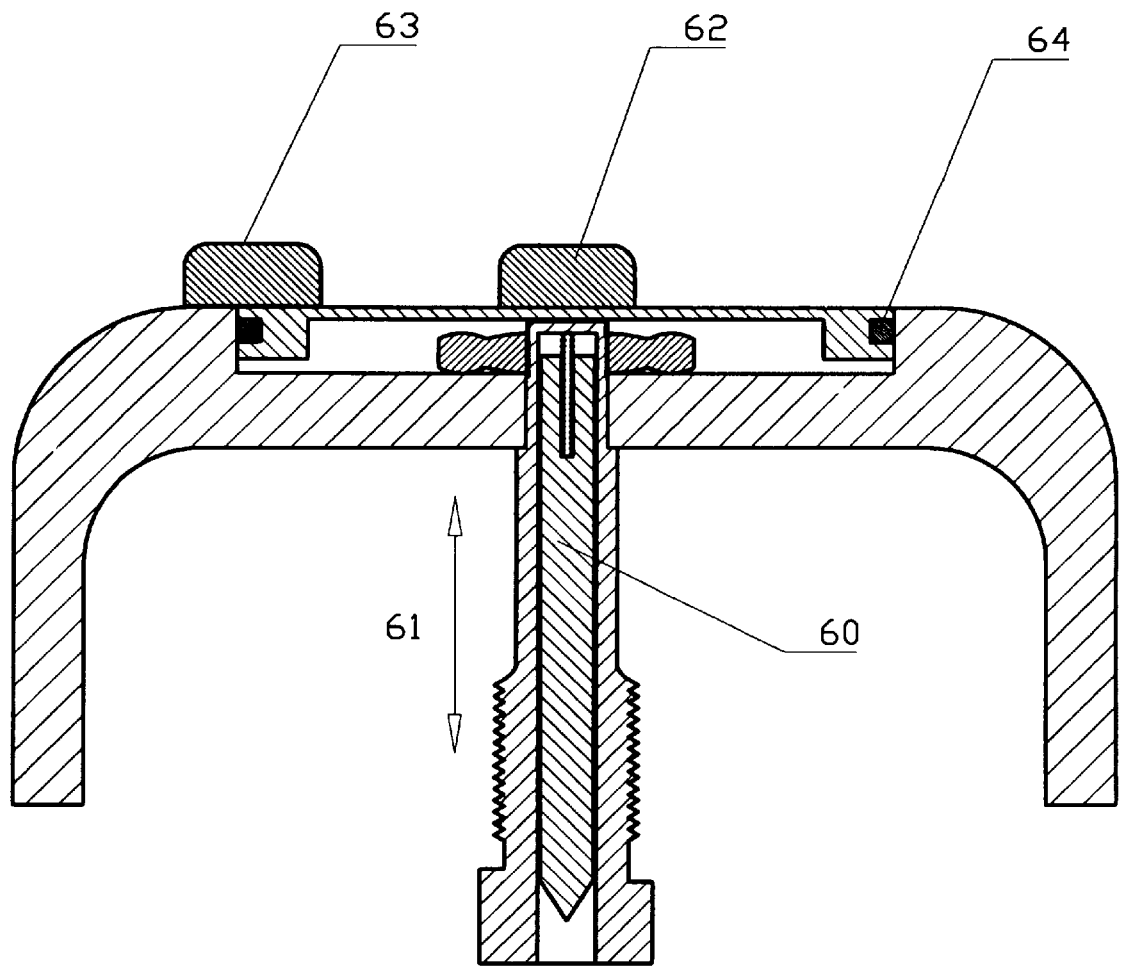
FIG. 5 shows another aspect of the invention, having a magnetic control means and also showing a fluid flow presetting feature and that it can be retrofitted in a standard shower cock or tap cock.

In FIG. 5 is illustrated another aspect of the present invention, wherein a magnet is used to control the operation of the valve. A piston 60 formed of steel or other magnetically attractable material, which can move in the direction of arrows 61 is able to be controlled by positioning a magnet 62 adjacent the end of the steel bar 60, consequently actuating the steel bar 60, to open or close the valve. The magnet may be removed to a position 62 such that magnetic attraction/repulsion of the steel bar 62 does not occur, consequently closing/opening the valve. A steel ring or other suitable retention means 64 is provided to 'store' the magnet. Movement of the magnet may be achieved directly or via a suitable actuating means. Modifications and variations to this embodiment will become readily apparent to persons skilled in the art.

In FIG. 6 is illustrated another aspect of the invention, relating to pilot operated type valves.

An inlet 81 communicates with chamber 83 via opening 82. The said opening 82 is formed by a relatively large orifice 85 partially filled with axially movable member 84. The difference in the cross-sections of orifice 85 and member 84 is the actual cross-section of opening 82. The movement of member 84 (in any direction) relative to orifice 85 will ensure opening 82 is cleared from deposited particulate matter. The use of member 84 in conjunction with orifice 85 to form openings 82 are also to ensure that the size of particles entering chamber 83 are small enough to easily pass through the relief valve 86 (not shown in FIG. 6). This particular feature of the invention (that is the arrangement used to form opening 82) can be used on all types of pilot operated valves to avoid the blockage of the pilot opening and the relief valve downstream, and, to also make it possible to have a pilot opening of a greatly reduced cross section.

Being able to achieve such reduction in the cross-section of the pilot opening, implies that the required pressure drop between inlet 81 and chamber 83, can be obtained at much lower fluid flow through the pilot opening 82 and the relief valve 86 (not shown in FIG. 6). Hence the openings and cross-sections associated with the relief valve can, in this case, be reduced. This reduction in the relief valve dimensions in turn implies that the forces required to activate the relief valve (open or shut) under certain pressure, are also reduced.

This will obviously open the way to using various simple mechanical and/or very low powered techniques for activating the relief valve.

FIG. 7 shows a pilot operated valve having inlet 101 communicates with chamber 103 via opening 102. The opening 102 is formed by a relatively large orifice 105 partially filled with axially movable member 104. The difference in the cross-section of orifice 105 and member 104 is the actual cross-section of opening 102.

The axial movement of member 104 relative to orifice 105 will ensure opening 102 is cleared from deposited particulate matter. The use of member 104 in conjunction with orifice 105 to form opening 102 is also to ensure that the size of particles entering chamber 103 are small enough to easily pass through the relief valve 106. This particular feature of the invention (that is the arrangement used to form opening 102) can be used on all types of pilot operated valves to achieve the following.

Firstly, it avoids the blockage of the pilot opening and/or the relief valve downstream.

Secondly, it also makes it possible to have a pilot opening of a greatly reduced cross-section.

Being able to achieve such reduction in the cross-section of the pilot opening, implies that the required pressure drop between inlet 101 and chamber 103, can be obtained at much lower fluid flow through the pilot opening 102 and the relief valve 106. Hence, the openings and cross-sections associated with the relief valve can, in this case, be reduced. This reduction in the relief valve dimensions, in turn, implies that the forces required to activate the relief valve, (open or shut) under certain pressure, are also reduced. This will obviously open the way to using various simple mechanical and/or very low powered techniques for activating the relief valve. Also, the reduction in the flow through opening 102 implies that the speed at which the valve member 107 moves to open and shut the valve is also reduced.

FIG. 7 shows body 108 of a standard household shower cock or tap cock retrofitted with (n assembly of the following parts valve member 107 which constitutes pilot opening 102 as described earlier.

Member 109 in which member 107 is sealingly and axially movable. Spring 110 is to overcome the friction between the member 109 and member 107. Member 112 (which is made of soft magnetic material) and opening 111 form the relief valve 106. Spring 113 is to push member 112 sealingly against opening 111. Member 114 is a slightly modified version of the spindle for a household water tap. This modification is to accommodate member 112 and spring 113. Member 115 is a loop of soft magnetic material jammed between cap 116 and hand 118. Permanent magnet 117 which can be attracted to either loop 115 or member 112. Member 118 may be rotated to adjust the axial position of member 114 for presetting the opening of the valve.

Note that it is best to have the following members 118, 116, 122 and 114 made out of paramagnetic material (like brass or plastic).

The valve is shown in FIG. 7 in its closed position because magnet 117 is attached to loop 115 and far enough from member 112 allowing spring 113 and member 112 to shut relief valve 106 hence allowing the pressure in chamber 103 to be equal to the inlet pressure 101 and member 107 is pushed against the valve seat 119 because the cross-section of the seat valve is smaller than the cross-section of the face of member 107 which is part of the walls of chamber 103. In this state, there is no net hydraulic forces acting on member 104. When magnet 117 is pushed away from loop 115 towards member 112 causing it to move away from opening 111 (i.e. openings relief vale 106) causing the pressure in chamber 103 to drop and member 107 to move away from the valve seat 119 hence, fluid flows through the valve at a rate determined by the axial preset position of member 114. During this time, due to the pressure difference between inlet 101 and chamber 103 member 104 is pushed up relative to member 107 to clear openings 102 form any solid matter and causing spring 120 to be compressed.

When magnet 117 is moved away from member 112 the valve goes black to its closed state, and member 104 is also forced back to its original position at which spring 120 is not as compressed.

The fact that the valve cannot be opened without the magnet makes it ideally safe for children.

Obviously, there are many ways of opening relief valve 106 by means of mechanical mechanism or electromagnetism which may be of a very low power.

Various arrangements of valving devices are means to improve their operation have therefore been hereinbefore described.

It will be understood to persons skilled in the art that variations and modifications will be possible. All such variations and modifications should be considered to fall within the scope of the invention as hereinbefore described and as hereinafter claimed.

I claim:

1. A valve device including:

a first fluid port;

a second fluid port;

a valve seat defining an aperture through which fluid may flow from said first port to said second port;

a valve member, moveable relative to said valve seat between a seated position and a lifted position;

a control chamber formed at least in part by said valve member;

a first passageway communicating between said control chamber and said first port;

a second passageway communicating between said control chamber and said second port;

a control valve associated with at least one of said passageways to permit fluid flow therethrough, and to thereby urge said valve member into one of said seated and said lifted position; and, a flow control element provided within at least one of said passageways to restrict the flow of fluid through said passageways, and, to prevent the ingress of particles which might otherwise clog said passageways and flow paths downstream thereof, said flow control element including:

a substantially longitudinal element having a cross-sectional area smaller than the cross-sectional area of said one passageway;

retaining means to retain said element within said one passageway whilst permitting movement; and biasing means which permits said element to automatically move within said one passageway whenever said valve is at least one of activated and under the influence of fluid movement in said device;

such that, as said element moves, said one passageway is at least one of cleaned and cleared of particulate matter including dirt and other deposits.

2. A valve device as claimed in claim 1, wherein said retaining means is formed with enlarged ends on the ends of said flow control element.

3. A valve device as claimed in claim 1, wherein said flow control element increases response time of actuation of said valve member and reduces water hammer in a conduit connected to said valve device.

4. A valve device as claimed in claim 1, wherein said valve device comprises one of a float and flood valve, whereby said control valve includes a longitudinal actuating member extending through said second passageway, a first end of said actuating member having a sealing means adapted to selectively prevent the passage of fluid through said second passageway, and a second end of said actuating member adapted to be moved, to seal and unseal said sealing means.

5. A valve device as claimed in claim 4, wherein said second end of said actuating member is adapted to pivot said actuating member in an axially transverse direction relative to said sealing means to thereby selectively permit and prevent the passage of said fluid through said passageway.

6. A valve device as claimed in claim 4, wherein said second end of said actuating member is adapted to move said actuating member in the axial direction relative to said sealing to thereby selectively prevent and permit the passage of said fluid through said passageway.

7. A valve device as claimed in claim 4, wherein said actuating member is integrally formed with said flow control element.

8. A valve device as claimed in claim 4, wherein said second end of said actuating member is provided with one of a heavy and lightweight load thereon adapted to respond to the level of fluid surrounding said second end of said actuating member.

9. A valve device as claimed in claim 1, wherein said control valve includes:

an actuating member adapted to one of directly and indirectly control the flow of fluid, moveable between first and second positions, said actuating member being formed of one of ferromagnetic and magnetic material;

a control means, formed of one of magnetic and ferromagnetic material to cooperate with and control the movement of said actuating member when brought into proximity therewith.

10. A valve device, as claimed in claim 9, wherein said actuating member is provided within a housing, an upper portion of said housing being additionally provided with a control means storage position to store said control means whilst not in use.

11. A valve device as claimed in claim 1 wherein said biasing means comprises a spring.

12. A valve device as claimed in claim 1 wherein said flow control element permits reduction of power required to actuate said valve member.

13. A valve device as claimed in claim 12 wherein:

said power required to actuate said valve member is independent of the quantity of said particulate matter in said fluid reaching an upstream end of said one passageway.

14. A valve device as claimed in claim 1, wherein:

said flow control element, in preventing the ingress of said particles which might otherwise clog said passageways and flow paths downstream thereof, causes said particles to be washed away with a main fluid flow through said aperture from said first fluid port to said second fluid port.

15. A valve device as claimed in claim 1, wherein the size of said passageways and the flow rate of fluid through said passageways are independent of the quantity of particulate matter in said fluid reaching the upstream end of said one passageway.

16. In a valve device, a flow control element adapted for disposition within a substantially longitudinal fluid passageway of said valve device for controlling operation thereof, said flow control element including:

a substantially longitudinal element having a cross-sectional area smaller than the cross-sectional area of said passageway;

retaining means to retain said element within said passageway whilst permitting automatic movement of said element relative to said passageway; and, a biasing means which permits said element to alter its position within said passageway;

such that, said flow control element enables a consistent low flow-rate of fluid through said passageway whilst said automatic movement of said element relative to said passageway cleans and clears said passageway from particulate matter including dirt and deposits whilst preventing the ingress of particles which might otherwise clog said passageway and flow paths downstream thereof;

characterized in that said flow control element provides a restricted flow rate of fluid to thereby control the operation of said valve device having a proportionally larger flow rate.

17. A flow control element as claimed in claim 16, wherein said retaining means comprises enlarged ends of said element.

18. A valve device as claimed in claim 16 wherein said biasing means comprises a spring.

* * * * *